Figure 1:
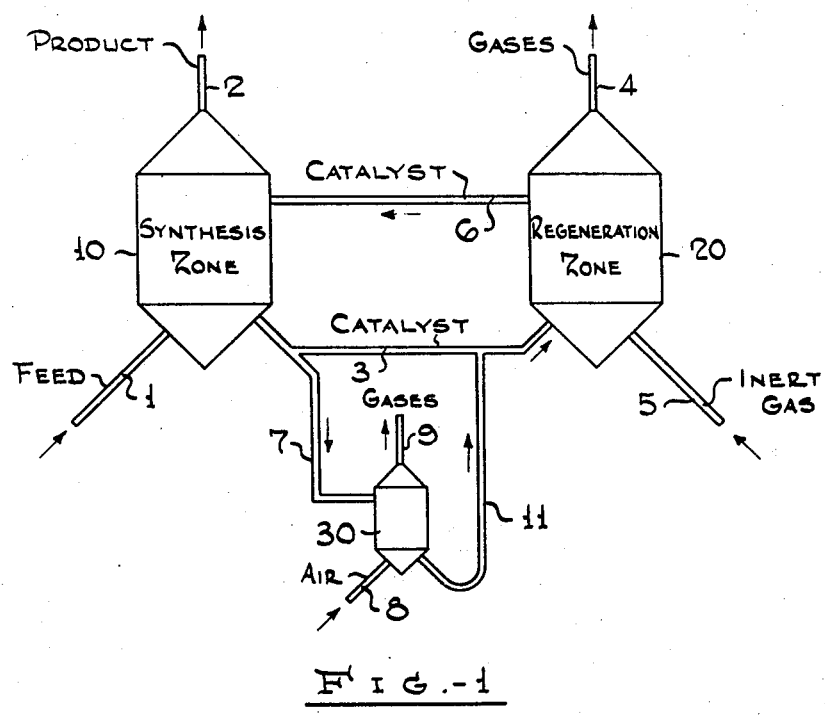

William H. Jones
Fred M. Long  Inventors
Robert W. Krebs
By P.J. Whelan Attorney Patented Feb. 13, 1951

2,541,654

UNITED STATES PATENT OFFICE 2,541,654

METHOD OF REGENERATING HYDRO-CARBON SYNTHESIS CATALYST

William H. Jones, Fred M. Long, and Robert W. Krebs, Baton Rouge, La., assignors to Standard Oil Development Company, a corporation of Delaware Application June 3, 1947, Serial No. 752,250

10 Claims. (Cl. 260—449.6)

1

The present invention is concerned with an improved hydrocarbon synthesis reaction. It is more particularly concerned with a hydrocarbon synthesis process which is directed toward minimizing and controlling carbon formation on the catalyst. In accordance with our invention, catalyst containing carbon is withdrawn from the synthesis zone and heated in a regeneration zone in relatively oxygen-free atmosphere under conditions whereby the oxygen necessary to oxidize the carbon is supplied from the oxygen of the catalyst itself. For operating in accordance with our process, the catalyst is withdrawn from the synthesis zone at a point below which the concentration of the carbon is critical and at a point where an optimum ratio exists between the carbon present on the catalyst and the oxygen present in the catalyst. When operating in accordance with our process, the reduction step necessary in a conventional regeneration process may be eliminated.

It is well known in the art to conduct hydrocarbon synthesis reactions by contacting hydrogen and oxides of carbon with catalysts under various temperature and pressure conditions. The catalyst employed is usually selected from the iron group metals, as for example, iron, cobalt, and nickel. The catalysts are utilized either alone or are employed in conjunction with carriers, such as kieselguhr, diatomaceous earth, synthetic gels, silica, and alumina. Promoters such as oxides of chromium, zinc, aluminum, magnesium, and the alkali metals are used with the iron group metals. These catalysts are employed in either fixed bed or fluid catalyst operations.

The temperatures employed in the synthesis reaction zone vary widely, as for example, in the range from about 300° F. to about 800° F., and are generally in the range from about 350° F. to about 725° F. The pressures, likewise, vary considerably and are a function of other operating conditions, such as catalyst employed, activity of the catalyst, character of the feed gases, and the temperatures utilized. Pressures in the range from about 1 to about 100 and higher atmospheres have been suggested. The character of the feed gases introduced into the synthesis reaction zone depends somewhat on the particular temperatures and pressures, and upon the catalyst employed. For example, when employing cobalt type catalysts, it is preferred to use about 1 mol of carbon monoxide to about 2 mols of hydrogen, while when an iron catalyst is utilized, equal mols of hydrogen and carbon monoxide or

2

1 mol of carbon monoxide to about 2 mols of hydrogen in the feed synthesis gases may be used.

The synthesis gases comprising hydrogen and carbon monoxide are produced by various procedures. Methane or natural gas may be oxidized with a reducible metal oxide, with pure oxygen, or with gases comprising oxygen. Other feed stocks may comprise coal, shale, and other hydrocarbons. The reaction may be conducted in a single stage or in a plurality of stages. For example, one procedure is to employ a two-stage reforming process using steam, methane and carbon dioxide for the production of carbon monoxide and hydrogen. When employing methane as feed gas and oxidizing the same with a reducible metal oxide, the reactions are generally conducted at temperatures in the range from about 1400° F. to about 2000° F. When the synthesis gases are produced, by utilizing oxygen and natural gases, the temperatures in the reaction zone are usually in the range from about 2000° to about 3000° F.

It has heretofore been known in the art to contact gases and solids by passing the gases upwardly through an enlarged treating zone, containing a body of finely-divided solids to be contacted, at a controlled velocity to maintain the solids in the treating zone in quasi-liquid like state. Under properly controlled conditions, the subdivided solid particles are not only maintained in a highly turbulent, quasi-liquid and ebullient state, but there exists a rapid and overall circulation of the fluidized solids throughout the fluid bed.

Processes of this character, wherein fluidized solids are contacted with gases, have a number of inherent and important advantages. For example, intimate contact between the gases and the fluid subdivided solids is secured. It is also possible to maintain a substantially uniform temperature throughout the bed as a result of the extremely rapid transfer of heat from one section of the bed to the other because of the rapid circulation of the fluid subdivided solids. Furthermore, due to the rapid transfer of heat between the solids under these conditions, it is possible to readily add or extract heat from the mass at an extremely rapid rate. In these fluidized reactions the small subdivided solids or catalysts usually have a particle size in the range from about 1 to 200 microns and higher. These particles are suspended in a fluid ebullient state by means of the upflowing suspending gases, the velocity of which varies in the general range from about 0.1 to 5 feet per second.

In hydrocarbon synthesis reactions, one difficulty encountered is carbon deposition on the catalyst. This is particularly serious in a fluidized process. One result of carbon formation is that the catalyst disintegrates into fine carbonized particles which tend to become more buoyant and thus are removed from the reaction zone with the product gases. Furthermore, as the carbon concentration on the catalyst increases, disintegration occurs and fluidization of the catalyst decreases; the heat transfer coefficient drops and poor heat control results. Various suggestions have been directed towards solving this problem. For example, it has been suggested that high pressures be employed in the hydrocarbon synthesis zone. It has also been suggested that various recycling techniques be employed. These proposals have not been entirely successful.

As previously pointed out, carbon increases on the catalyst and it is necessary to withdraw the catalyst from the hydrocarbon synthesis zone and to regenerate the catalyst by the removal of carbon. We have now discovered that if the catalyst is treated in a relatively oxygen-free atmosphere as, for example, in a nitrogen atmosphere, particularly desirable results are secured. The carbon may be reduced to the desired degree by utilizing the oxygen present in the catalyst. The regenerated catalyst which is also a reduced catalyst is then returned directly to the synthesis zone eliminating any reduction stage.

The process of our invention may be more readily understood by the following examples illustrating embodiments of the same.

*Example 1*

A number of operations were conducted in accordance with our process. Catalysts containing various percentages of carbon were removed from the hydrocarbon synthesis zone and heated in an oxygen-free atmosphere at the specified temperatures. The results secured with respect to reduction of carbon on the catalyst and the oxygen on the catalyst are listed below:

| Operation | Catalyst | Temp. | Carbon, per cent | | Oxygen, per cent | |
|---|---|---|---|---|---|---|
| | | | Before | After | Before | After |
| | | °F. | | | | |
| 1 | A | 1,100 | 40.6 | 22.8 | 10 | 1.9 |
| 2 | A | 1,300 | 40.6 | 23.9 | 10 | 0.6 |
| 3 | B | 1,100 | 29.6 | 20.1 | 12.5 | 4.6 |
| 4 | B | 1,300 | 29.6 | 18.3 | 12.5 | 0.4 |
| 5 | C | 1,100 | 7.6 | 4.6 | 18.7 | 11.6 |
| 6 | C | 1,300 | 7.6 | 0.6 | 18.7 | 8.5 |

From the above data it is apparent that it is possible to remove the catalyst from the synthesis zone at a time at which the ratio of carbon to oxygen on the catalyst is such so that upon subsequent treatment in accordance with our process the desired ratio of carbon to oxygen on the catalyst is secured in the final product which is circulated to the synthesis zone.

*Example 2*

A number of operations were conducted varying the temperature at which the catalyst was regenerated in accordance with our process. In each run the initial catalyst had the same ratio of carbon to oxygen. The gas evolved was measured indicating the extent to which the carbon was removed at the respective temperatures. The results of the operation are tabulated as follows:

| Temperature | Mls. Gas (at Standard Conditions) Evolved per Gram Catalyst |
|---|---|
| 600° F. | 0 |
| 700° F. | 5 |
| 800° F. | 10 |
| 900° F. | 25 |
| 1,000° F. | 40 |
| 1,100° F. | 60 |
| 1,200° F. | 110 |
| 1,300° F. | 175 |
| 1,400° F. | 210 |

From the data presented in Example 1 and Example 2, it is apparent that it is desirable to have a temperature in the regeneration zone in the range of about 1100° F. to about 1400° F., preferably in the range from 1300° F. to 1400° F.

In the initial stages of the synthesis reaction, the catalyst comprises a relatively high weight percentage of oxygen as compared to carbon. As the reaction progresses the percentage (weight) of carbon increases. In accordance with a preferred embodiment of our invention, we withdraw the catalyst from the synthesis zone when the weight percentage of carbon is two to three times the weight percentage of oxygen. Thus, upon regeneration the carbon is substantially reduced, as well as the oxygen, permitting the recirculation of the reduced catalyst to the synthesis zone.

It is to be understood that the process may be somewhat modified. For example, carbon may be removed from the synthesis catalyst by first oxidizing the metal with air, oxygen, steam or carbon dioxide to a high degree and then heating this pre-oxidized catalyst at a temperature over about 1000° F. in an inert atmosphere. The process is particularly applicable when employing in the synthesis reaction a synthetic ammonia catalyst. Catalyst of this character usually comprises $Fe_3O_4$ and contains about 1½% $K_2O$ and about 3% $Al_2O_3$.

The scope of our invention may be more readily understood by reference to the drawings illustrating embodiments of the same. Figure 1 illustrates an adaptation of our process wherein the correct amount of oxygen is present on the catalyst withdrawn from the synthesis zone and introduced into the regeneration zone. Figure 1 also illustrates an adaptation of our process in which a partial oxidation zone is interposed between the synthesis zone and the regeneration zone.

Figure 2:
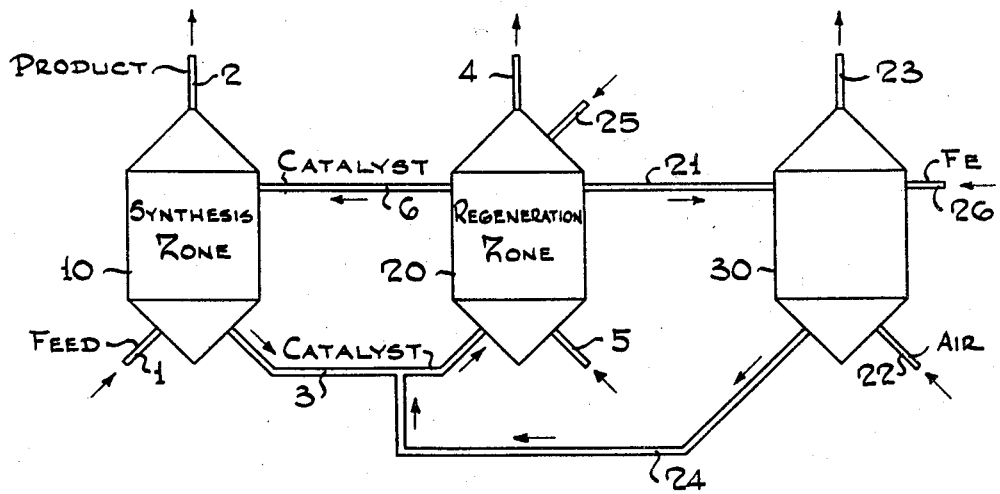

Figure 2 illustrates an adaptation of our process wherein needed oxygen is supplied to the regeneration zone by withdrawing a portion of the catalyst from the regeneration zone, oxidizing it to the desired extent in a third zone and returning the oxidized or partially oxidized catalyst to said regeneration zone.

Referring specifically to Figure 1, the process is shown in diagrammatical flow plan. Details well known and not essential with respect to the description of our invention are not shown. Feed gases are introduced into synthesis zone 10 by means of line 1 while the product gases are removed overhead through suitable equipment by means of line 2. Temperature and pressure and other operating conditions in zone 10 are maintained to secure the desired reaction. The catalyst containing oxygen is withdrawn from zone 10 by means of line 3 and introduced into regeneration zone 20. The catalyst in zone 20 is subjected to elevated temperature in the presence of an added inert gas under conditions to oxidize the carbon with the oxygen present on the catalyst. Product gases are removed overhead from zone 20 by means of line 4 while the inert gases are added by means of line 5. The catalyst from which oxygen and carbon have been removed is wtihdrawn from zone 20 by means of line 6 and reintroduced into synthesis zone 10.

Under certain conditions, it may be desirable to increase the oxygen content of the catalyst which is passed into regeneration zone 20. If this be desired, the catalyst is introduced into oxidation zone 30 by means of line 7. Air or another suitable oxidizing gas is introduced into zone 30 by means of line 8 while the product gases are withdrawn by means of line 9. The catalyst of increased oxygen content is withdrawn from zone 30 by means of line 11 and introduced into regeneration zone 20 and handled as hereinbefore described.

Referring specifically to Figure 2 in which elements similar to those shown in Figure 1 are designated by the same numeral, the operation is as follows:

The deficiency in oxygen content of the catalyst in zone 20 is made up to the desired extent by withdrawing catalyst from zone 20 by means of line 21 and introducing the same into oxidation zone 30. Air or a suitable equivalent oxidizing gas is introduced into zone 30 by means of line 22 while the product gases are withdrawn by means of line 23. The catalyst to which oxygen has been added to the desired degree is withdrawn from zone 30 by means of line 24 and introduced into regeneration zone 20. Under certain conditions it may be desirable to introduce the fresh catalyst comprising iron oxide directly into regeneration zone 20 by means of line 25 in order to supply the desired oxygen. This may eliminate the hydrogen reduction step in the preparation of the fresh catalyst. On the other hand, fresh catalyst comprising iron may be introduced into the system by means of line 26 and oxidation zone 30. It is to be understood that any desired combinations of these processes may be utilized.

Our invention is generally directed to a process wherein catalyst is removed from the synthesis zone and subjected to elevated temperatures in the presence of an added inert gas. When the catalyst comprises a synthetic ammonia catalyst, the preferred tempertaure is in the range from 1100° F. to 1400° F. On the other hand, when a pyrites ash catalyst is utilized which may be promoted with potassium carbonate, potassium fluoride, or a similar substance, the preferred temperature is in the range from 900° F. to 1100° F. Both the reductions (hydrogenation) and the oxidation-reduction (thermal reaction) are effected at a much lower temperature for pyrites ash than for other iron catalyst, such as ammonia synthesis catalyst. This is probably due to the inherent crystalline structure of the material.

Another adaptation of our invention is to heat an iron hydrocarbon synthesis catalyst which may be fresh or used, and which contains carbon and oxygen in an inert atmosphere, such as nitrogen at temperatures of from about 900 to 1100° F. This effects partial or almost complete removal of the carbon and oxygen, depending upon the extent to which each is present. This preliminary heat treatment produces an active catalyst. Carbide carbon is formed by the heating process and the maximum amount of carbide carbon is formed by heating at 1100° F. for a time period of from 1 to 4 hours, preferably for a time period of from 1½ to 2 hours. Thus, it is within the concept of our invention to heat treat the catalyst at a temperature of from 900 to 1100° F. in an initial stage to secure carbide formation, and then in a subsequent stage to heat treat the catalyst in the range from about 1100° F. to 1400° F. This adaptation and embodiment of our invention may be readily understood by the following examples illustrating the same.

Example 3

A synthetic ammonia catalyst containing 40.6% carbon, 10.0% oxygen and 0.5 to 0.7% $K_2O$ was heated at 1100° F. in atmospheric nitrogen for the time periods indicated. The percent carbide carbon formed for the respective time periods is shown:

| Time Period | Per Cent Carbide Carbon |
|---|---|
| No Heating | 0.2 to 0.3 |
| ¼ Hour | 0.8 |
| 1 Hour | 1.4 |
| 2 Hours | 1.7 |
| 3 Hours | 0.53 |
| 6 Hours | 0.58 |
| 24 Hours | 0.18 |

Example 4

A pyrites catalyst containing 26.1% carbon, 10.9% oxygen and 0.9% $K_2O$ was heated at 1100° F. in an atmosphere of nitrogen with the following results:

| Time Period | Per Cent Carbide Carbon |
|---|---|
| No Heating | 1.45 |
| ½ Hour | 3.4 |
| 1 Hour | 3.3 |
| 1½ Hours | 3.3 |
| 2 Hours | 1.3 |
| 14 Hours | nil |

Example 5

Used pyrites catalyst, similar to that described in Example 4, was heated at 900° F. in an atmosphere of nitrogen with the following results:

| Time Period | Per Cent Carbide Carbon |
|---|---|
| No Heating | 1.45 |
| ½ Hour | 1.2 |
| 1 Hour | 2.7 |
| 2 Hours | 1.54 |

The process of our invention is not to be limited by any theory as to mode of operation, but only in and by the following claims in which it is desired to claim all novelty insofar as the prior art permits.

We claim:

1. In a hydrocarbon synthesis process wherein carbon monoxide and hydrogen react in a synthesis zone in the presence of a fluidized catalyst comprising iron to form hydrocarbon constituents containing more than one carbon atom in the molecule and wherein carbon and oxygen build up on the catalyst, the improvement which comprises removing catalyst from the synthesis zone and passing the same to a regeneration zone, subjecting said catalyst in said regeneration zone to elevated temperatures within the range of 900°–1400° F. in the presence of an added inert gas, whereby the oxygen on the catalyst oxidizes the carbon, withdrawing catalyst from said regeneration zone and recycling same to said synthesis zone.

2. Process as defined by claim 1 wherein said atmosphere in the said regeneration zone is an atmosphere of nitrogen, and wherein the catalyst comprises a synthetic ammonia iron catalyst, and the temperature is in the range of about 1100° F. to 1400° F.

3. Process as defined by claim 1 wherein said catalyst comprises a synthetic ammonia iron catalyst, and the temperature maintained in said regeneration zone is in the range from about 1300° F. to about 1400° F., and wherein an atmosphere of nitrogen or other inert gas is maintained in said regeneration zone.

4. In a hydrocarbon synthesis process wherein carbon monoxide and hydrogen react in a synthesis zone in the presence of a fluidized catalyst comprising iron to form hydrocarbon constituents containing more than one carbon atom in the molecule and wherein the oxygen and the carbon concentration build up on the catalyst and wherein it is desirable to produce a regenerated catalyst having a predetermined concentration of carbon and oxygen, the improvement which comprises withdrawing catalyst from said synthesis zone when the concentration of carbon and oxygen have reached a predetermined level, passing said catalyst to a regeneration zone, subjecting said catalyst in said regeneration zone to elevated temperatures within the range of 900° to 1400° F. in the presence of added inert gas, and withdrawing from said regeneration zone a catalyst having the desired concentration of carbon and oxygen.

5. Process as defined by claim 4 wherein said catalyst withdrawn from said regeneration zone is recycled to said synthesis zone.

6. Process as defined by claim 4 wherein said catalyst comprises a synthetic ammonia iron catalyst and the elevated temperatures are in the range from about 1100° F. to about 1400° F.

7. Process as defined by claim 4 wherein said catalyst comprises a synthetic ammonia iron catalyst, and the atmosphere in said regeneration zone comprises an atmosphere of nitrogen and wherein said elevated temperature is in the range from about 1300° F. to about 1400° F.

8. In a hydrocarbon synthesis process wherein carbon monoxide and hydrogen react in a synthesis zone in the presence of a synthetic ammonia iron catalyst to form a hydrocarbon constituent containing more than one carbon atom in the molecule and wherein carbon and oxygen build up on the catalyst, the improvement which comprises removing synthetic ammonia catalyst from the synthesis zone, oxidizing the catalyst to a high degree, and then heating this pre-oxidized catalyst at a temperature in excess of 1000° F. in an inert atmosphere whereby the carbon is oxidized with the oxygen present in the catalyst and recycling said catalyst to the synthesis zone.

9. Process as defined by claim 8 wherein said catalyst is oxidized with air.

10. The process of claim 1 wherein said catalyst comprises iron derived from pyrites ash and the temperature maintained in said regeneration zone is in the range of from about 900°–1100° F.

WILLIAM H. JONES.
FRED M. LONG.
ROBERT W. KREBS.

REFERENCES CITED

The following references are of record in the file of this patent:

UNITED STATES PATENTS

| Number | Name | Date |
| --- | --- | --- |
| 1,904,440 | Freyermuth | Apr. 18, 1933 |
| 2,259,961 | Myddleton | Oct. 21, 1941 |
| 2,273,864 | Houdry | Feb. 24, 1942 |
| 2,360,787 | Murphree | Oct. 17, 1944 |
| 2,365,094 | Michael et al. | Dec. 12, 1944 |
| 2,462,861 | Gunness | Mar. 1, 1949 |